(12) United States Patent
Singh et al.

(10) Patent No.: US 12,718,528 B2
(45) Date of Patent: Aug. 25, 2026

(54) REAL TIME FACE SWAPPING SYSTEM AND METHODS THEREOF

(71) Applicant: Jio Platforms Limited, Ahmedabad (IN)

(72) Inventors: Nikhil Kumar Singh, Singrauli (IN); Bhupendra Sinha, Pune (IN); Gaurav Duggal, Hyderabad (IN); Gaurav Mathuria, Jaipur (IN); Sameer Mehta, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 406 days.

(21) Appl. No.: 18/159,104

(22) Filed: Jan. 25, 2023

(65) Prior Publication Data

US 2023/0237778 A1 Jul. 27, 2023

(30) Foreign Application Priority Data

Jan. 25, 2022 (IN) ............................ 202221004233

(51) Int. Cl.

| | |
|---|---|
| ***G06V 10/774*** | (2022.01) |
| ***G06T 7/33*** | (2017.01) |
| ***G06V 10/56*** | (2022.01) |
| ***G06V 10/82*** | (2022.01) |
| ***G06V 10/94*** | (2022.01) |
| ***G06V 40/16*** | (2022.01) |

(52) U.S. Cl.

CPC ............ *G06V 10/774* (2022.01); *G06T 7/344* (2017.01); *G06V 10/56* (2022.01); *G06V 10/82* (2022.01); *G06V 10/95* (2022.01); *G06V 40/171* (2022.01); *G06V 40/172* (2022.01)

(58) Field of Classification Search

CPC ........ G06T 7/344; G06V 10/52; G06V 10/56; G06V 10/774; G06V 10/82; G06V 10/95; G06V 40/171; G06V 40/172

See application file for complete search history.

(56) References Cited

U.S. PATENT DOCUMENTS

2020/0358983 A1* 11/2020 Astarabadi ............. H04N 7/157
2021/0272253 A1* 9/2021 Lin ...................... G06V 10/761

OTHER PUBLICATIONS

Korshunova et al, "Fast Face-swap Using Convolutional Neural Networks", 2017 (Year: 2017).*
Natsume et al, "FSNet: An Identity-Aware Generative Model for Image-based Face Swapping", 2018 (Year: 2018).*
Nirkin et al, "On Face Segmentation, Face Swapping, and Face Perception", 2018 (Year: 2018).*

* cited by examiner

*Primary Examiner* — Ruiping Li

(74) *Attorney, Agent, or Firm* — FINNEGAN, HENDERSON, FARABOW, GARRETT & DUNNER LLP

(57) ABSTRACT

The present invention provides a robust and effective solution to an entity or an organization by enabling them to implement a system for swapping one or more faces without any explicit training on the one or more faces. The proposed method can be further implemented in real time.

17 Claims, 13 Drawing Sheets

500A

REAL TIME FACE SWAPPING SYSTEM AND METHODS THEREOF

FIELD OF INVENTION

The embodiments of the present disclosure generally relate to the field of image processing and generative adversarial networks. More particularly, the present disclosure relates to a system and method for facilitating face swap and face manipulation in real time.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With the widespread proliferation of digital image capture devices such as digital cameras, digital video recorders, mobile phones containing cameras, personal digital assistants containing cameras, etc., an ever-increasing body of digital images is widely available. These digital images are frequently made available in public forums, such as Web sites and search engines on computer networks such as the Internet. In many cases, however, a person's face in a given picture may be undesirable. For example, it may be undesirable to have a given person's face in a picture when that person would like to maintain a certain level of privacy. Similarly, a person's face in a given picture may be undesirable because the person's eyes were closed, the person was not smiling, the person was looking away, and the like.

One prior art is a novel recurrent neural network (RNN) based approach and continuous interpolation of the face views based on re-enactment, Delaunay Triangulation, and barycentric coordinates. However, its results are not realistic, and in most cases fail to look similar to source face.

Another prior art may be motivated by the concept of bump mapping and proposes a layered approach which decouples estimation of a global shape from its mid-level details, estimates a coarse 3D face shape which acts as a foundation and then separately layer this foundation with details represented by a bump map. However, the output results of face reconstruction looks robotic, and natural feel is missing.

Another prior art discloses a method to restore de-occluded face images based on inverse use of 3DMM and generative adversarial network. It proposes a Pipeline of face swapping which integrates some learning-based modules into the traditional replacement based approach. However, results are not realistic, and in most cases fail to look similar to source face. Moreover, de-occluded textures are pixelated and hazy in most of the cases.

Another prior art discloses a model-based face autoencoders to segment occluders accurately without requiring any additional supervision during training, and this separates regions where the model will be fitted from those where it will not be fitted. However, 3DMM doesn't adapt to the target face textures properly, as a consequence, it looks like target face is covered with cardboard mask.

Further, existing systems and methods have the following limitations/challenges

Realistic look: A person X's face swapped onto person Y's face gives a face which doesn't look like either of them. The resultant image looks somewhat like a morphed version of both. Our method has shown to give a more realistic look.

Significant difference in colour and contrast: If the original images are taken in different lighting, background, and camera settings, the swapped region and target frontal head has significant difference in colour and contrast, which is not desirable.

Pose correction: If the original images have different poses, the resultant swapped image doesn't come out good. Delaunay Triangulation coupled with few strategies aimed at first aligning input image according to pose of output image, and then swapping them, has given good results.

Large training time: Many systems rely on Generative Adversarial Networks solely which require heavy computations over GPUs or TPUs, large model training times, and hence are not suitable for real time applications. To account for this problem, in this invention, we focus on aiding GAN networks using image processing techniques.

There is, therefore, a need in the art to provide a system and a method for providing an efficient face swapping without any explicit training on those faces and in real time.

OBJECTS OF THE PRESENT DISCLOSURE

Some of the objects of the present disclosure, which at least one embodiment herein satisfies are as listed herein below.

It is an object of the present disclosure to provide a real time solution, that can be incorporated in live activities and engagement programs.

It is an object of the present disclosure to provide image processing techniques and Generative Adversarial Networks to bring a real time and realistic solution.

It is an object of the present disclosure to provide a system that facilitates face construction network and style transfer network to optimize outputs of image processing techniques.

It is an object of the present disclosure to facilitate better convergence of cost functions by feeding Generative Adversarial Networks with weights optimized by Hessian error compensation to yield much faster and yield better results.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for facilitating real time face swapping of a user. The system may include one or more processors operatively coupled to a plurality of user computing devices, the one or more processors comprising a memory, the memory storing instructions which when executed by the one or more processors causes the system to receive a first set of data packets from the plurality of computing devices, the first set of data packets pertaining to a video stream of the user, the video stream comprising one or more source facial features of the user, and receive a set of potential target facial features associated with the user from a knowledgebase associated with a centralized server. The system may be configured to extract a first set of attributes from the first set of data packets, the first set of attributes pertaining to one or more occlusions in the one or more source facial features of the user. Based on the extracted first and second set of attributes, the system may be configured to optimize, through a face reconstruction module, the one or more source facial features of the user such that the one or more source facial features match the set of potential target facial features of the user and generate an optimized one or more facial features of the user and further color code the optimized one or more source facial features, using a Guided Generative Adversarial Network (GAN) module, based on the set of potential target facial features of the user. Furthermore, the system may be configured to swap, using the GAN module, the color coded one or more facial features with the one or more source facial features to generate an accurate image of the user.

In an embodiment, the system may be further configured to align, by using a Delaunay Triangulation module, the accurate image of the user according to alignment of the set of potential target facial features of the user.

In an embodiment, the system may be further configured to convolve, by using a Pyramid Blending module, the optimized one or more facial encoding with occlusion encoding using a mask from a segmentation network module to generate a final swapped accurate image of the user.

In an embodiment, the system may be further configured to preserve, by using a transfer network module, a set of finer feature details of the final swapped accurate image of the user.

In an embodiment, the system may be further configured to generate, using a Hessian aided error compensation module, one or more skin regions occluded due to the one or more occlusions in the one or more facial features of the user.

In an embodiment, the system may be further configured to detect the one or more source facial features using one or more face detection devices such as scanning and extraction camera sensor.

In an embodiment, the video stream of the user may include a plurality of variations and diverse face profiles of the user.

In an embodiment, the plurality of variations and diverse face profiles of the user may include a plurality of profiles such as left, right, front and back.

In an embodiment, the system may be further configured to generate, using a machine learning (ML) model, a trained model configured to process the accurate image of the user to identify and verify the user in real time.

In an embodiment, the system may be further configured to predict, by the ML engine, from a plurality of services received by the system, an information service associated with the swapped accurate image of the user; facilitate, by the ML engine, a response corresponding to the information service to the user based on the trained model and auto-generate the response by the system to the user.

In an embodiment, the system may be further configured to store, based on a consent of the user, the one or more source facial features of the user and store based on the one or more face detection devices available in the user computing device associated with the user.

In an aspect, the present disclosure provides for a user equipment (UE) for facilitating real time face swapping of a user. The UE may include a processor comprising a memory storing instructions which when executed by the processor may cause the UE to receive a first set of data packets from a plurality of computing devices, the first set of data packets pertaining to a video stream of the user, the video stream comprising one or more source facial features of the user and receive a set of potential target facial features associated with the user from a knowledgebase associated with a centralized server. The UE may be configured to extract a first set of attributes from the first set of data packets, the first set of attributes pertaining to one or more occlusions in the one or more source facial features of the user. Based on the extracted first and second set of attributes, the UE may be configured to optimize, through a face reconstruction module, the one or more source facial features of the user such that the one or more source facial features match the set of potential target facial features of the user and generate an optimized one or more facial features of the user and further color code the optimized one or more source facial features, using a Guided Generative Adversarial Network (GAN) module, based on the set of potential target facial features of the user. Furthermore, the UE may be configured to swap, using the GAN module, the color coded one or more facial features with the one or more source facial features to generate an accurate image of the user.

In an aspect, the present disclosure provides for a method for facilitating real time face swapping of a user. The method may include the steps of receiving, by one or more processors, a first set of data packets from the plurality of computing devices, the first set of data packets pertaining to a video stream of the user, the video stream comprising one or more source facial features of the user. The one or more processors may be operatively coupled to a plurality of user computing devices and the one or more processors may include a memory storing instructions which may be executed by the one or more processors. Further, the method may include the step of receiving, by the one or more processors, a set of potential target facial features associated with the user from a knowledgebase associated with a centralized server and the step of extracting, by the one or more processors, a first set of attributes from the first set of data packets, the first set of attributes pertaining to one or more occlusions in the one or more source facial features of the user. Based on the extracted first and second set of attributes, the method may include the step of optimizing, through a face reconstruction module, the one or more source facial features of the user such that the one or more source facial features match the set of potential target facial features of the user and generate an optimized one or more facial features of the user. The method may include the step of color coding the optimized one or more source facial features, using a Guided Generative Adversarial Network (GAN) module, based on the set of potential target facial features of the user. Furthermore, the method may include the step of swapping, using the GAN module, the color coded one or more facial features with the one or more source facial features to generate an accurate image of the user.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution to an entity or an organization by enabling them to implement a system for swapping one or more faces without any explicit training on the one or more faces. The proposed method can be further implemented in real time.

Figure 1:
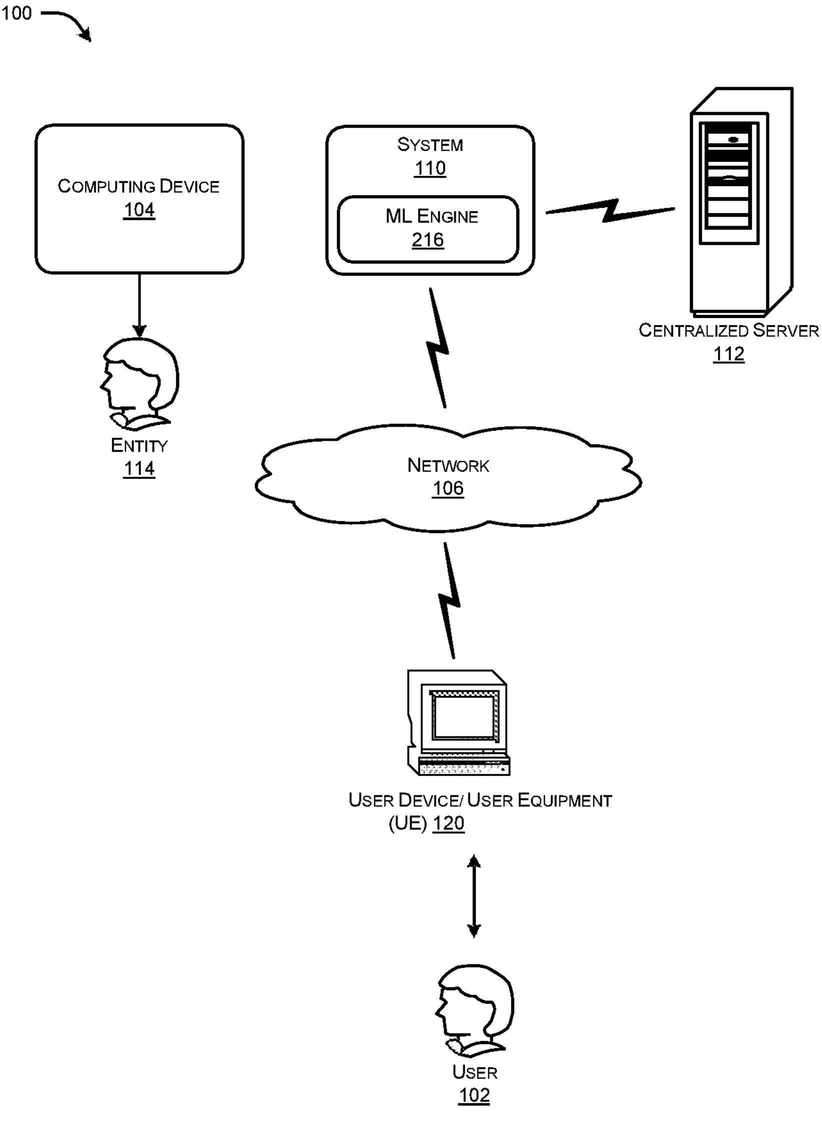
FIG. 1 illustrates an exemplary network architecture in which or with which the system of the present disclosure can be implemented, in accordance with an embodiment of the present disclosure.

Referring to FIG. 1 that illustrates an exemplary network architecture (100) in which or with which system (110) of the present disclosure can be implemented, in accordance with an embodiment of the present disclosure. As illustrated in FIG. 1, by way of example but not limitation, the exemplary architecture (100) may include a user (102) associated with a user computing device (120) (also referred to as user device (120)), at least a network (106) and at least a centralized server (112). More specifically, the exemplary architecture (100) includes a system (110) equipped with a machine learning (ML) engine (216) for facilitating recognition and registration of the user (102) that can receive a first set of data packets that may include a video stream from the user computing device (104) or any face detection devices. In an exemplary embodiment, the face detection devices may include a scanning and extraction camera sensor but not limited to the like. The video stream may pertain to facial features of the user (102). The system (110) may include a database (210) that may store a knowledgebase having a set of potential identity information associated with the facial features of the user (102) and a plurality of information associated with the user (102). The user device (120) may be communicably coupled to the centralized server (112) through the network (106) to facilitate communication therewith. As an example, and not by way of limitation, network architecture (100) may include a second computing device (104) (also referred to as computing device hereinafter) associated with an entity (114). The computing device (104) may be operatively coupled to the centralised server (112) through the network (106).

In an exemplary embodiment, the set of data packets may include all variations and diverse face profiles to maximize accuracy at the time of face swapping. Separate point multiple profiles such as left, right, front and the like may be captured. The system captures the face profiles of the user through a live video feed, following a pre-defined protocol.

In an exemplary embodiment, the system (110) may be configured with a plurality of instructions such as Guided Generative Adversarial Network (GAN), image processing techniques to perform the face swapping in real time.

In an embodiment, the system (110) may further configure the ML engine (216) to generate, through an appropriately selected machine learning (ML) model of the system in a way of example and not as limitation, a trained model configured to process the identified and registered user, and predict, from the plurality of services, an information service associated with the face swapping of the user, and facilitate response corresponding to the information service to the user based on the trained model. The ML engine (216) may be further configured to auto-generate the response by the system to the user. The ML engine (216) may generate the trained model based on Guided Generative Adversarial Network (GAN), image processing techniques to perform the face swapping in real time.

In yet another embodiment, the system (110) may store consent of the user to store facial features of the user (102) and upon receipt of the consent of the user the system (110) may store the facial features of the user. In another embodiment, the facial features may be stored based on the face scanners available in the user computing device (120) associated with the user (102).

In an exemplary embodiment, the ML engine (216) can be configured with face detection, facial landmarks detection, face alignment, Delaunay triangulation, pyramid blending techniques and the like to perform face swapping.

In an embodiment, the computing device (104) and/or the user device (120) may communicate with the system (110) via set of executable instructions residing on any operating system, including but not limited to, Android™, iOS™, Kai OS™ and the like. In an embodiment, computing device (104) and/or the user device (120) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

In an exemplary embodiment, a network 106 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2A:
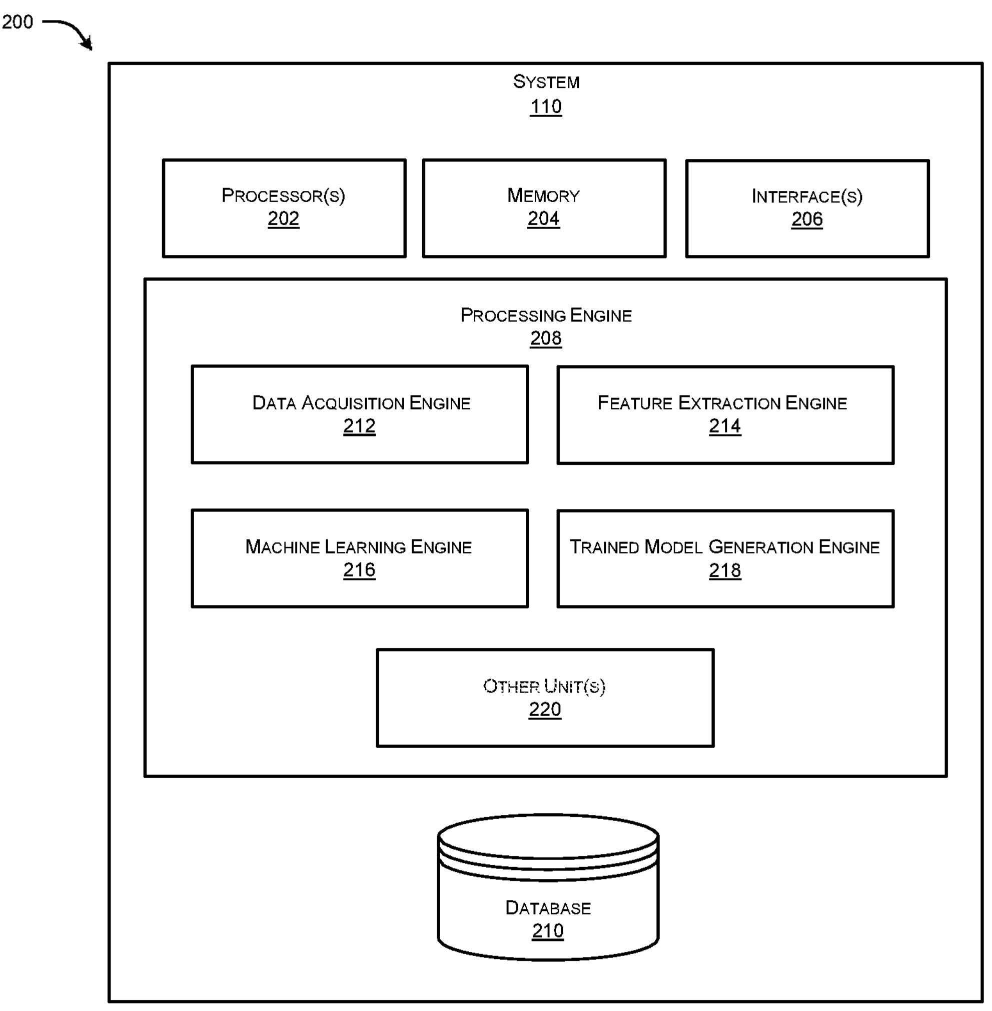
FIG. 2A illustrates an exemplary representation (200) of system (110), in accordance with an embodiment of the present disclosure.

In an embodiment, the system (110) may include one or more processors coupled with a memory, wherein the memory may store instructions which when executed by the one or more processors may cause the system to perform the generation of automated visual responses to a query. FIG. 2 with reference to FIG. 1, illustrates an exemplary representation of system (110) for facilitating registration of a user are transmitted based on a machine learning based architecture, in accordance with an embodiment of the present disclosure. In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) 206 may comprise a variety of interfaces, for example, interfaces for data input and output devices, referred to as I/O devices, storage devices, and the like. The interface(s) 206 may facilitate communication of the system (110). The interface(s) 206 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a data acquisition (212), a feature extraction (214), a machine learning (ML) engine (216), and other engines (218). The other engines may include face reconstruction module, a Guided Generative Adversarial Network (GAN) module, Delauney triangulation module, Pyramid Blending module, transfer network module and Hessian aided error compensation module and the like.

The data acquisition engine (212) may be configured to receive a first set of data packets from the plurality of computing devices (104), the first set of data packets pertaining to a video stream of the user (102), the video stream comprising one or more source facial features of the user (102), and further receive a set of potential target facial features associated with the user from a knowledgebase associated with a centralized server (112).

The feature extraction engine (214) may be configured to extract a first set of attributes from the first set of data packets, the first set of attributes pertaining to one or more occlusions in the one or more source facial features of the user.

The ML engine (216) may optimize through a face reconstruction module, the one or more source facial features of the user such that the one or more source facial features match the set of potential target facial features of the user based on the extracted first and second set of attributes and generate an optimized one or more facial features of the user and further color code the optimized one or more source facial features, using a Guided Generative Adversarial Network (GAN) module, based on the set of potential target facial features of the user.

The ML engine (216) may further swap, using the GAN module, the color coded one or more facial features with the one or more source facial features to generate an accurate image of the user. The ML engine may further generate, a trained model configured to process the accurate image of the user to identify and verify the user in real time and then predict from a plurality of services received by the system, an information service associated with the swapped accurate image of the user; facilitate, by the ML engine, a response corresponding to the information service to the user based on the trained model and auto-generate the response by the system to the user.

In an embodiment, the Delauney Triangulation module may align the accurate image of the user according to alignment of the set of potential target facial features of the user.

In an embodiment, the Pyramid Blending module may convolve the optimized one or more facial encoding with occlusion encoding using a mask from a segmentation network module to generate a final swapped accurate image of the user.

In an embodiment, the transfer network module may preserve a set of finer feature details of the final swapped accurate image of the user.

In an embodiment, the Hessian aided error compensation module may generate one or more skin regions occluded due to the one or more occlusions in the one or more facial features of the user.

Figure 2B:
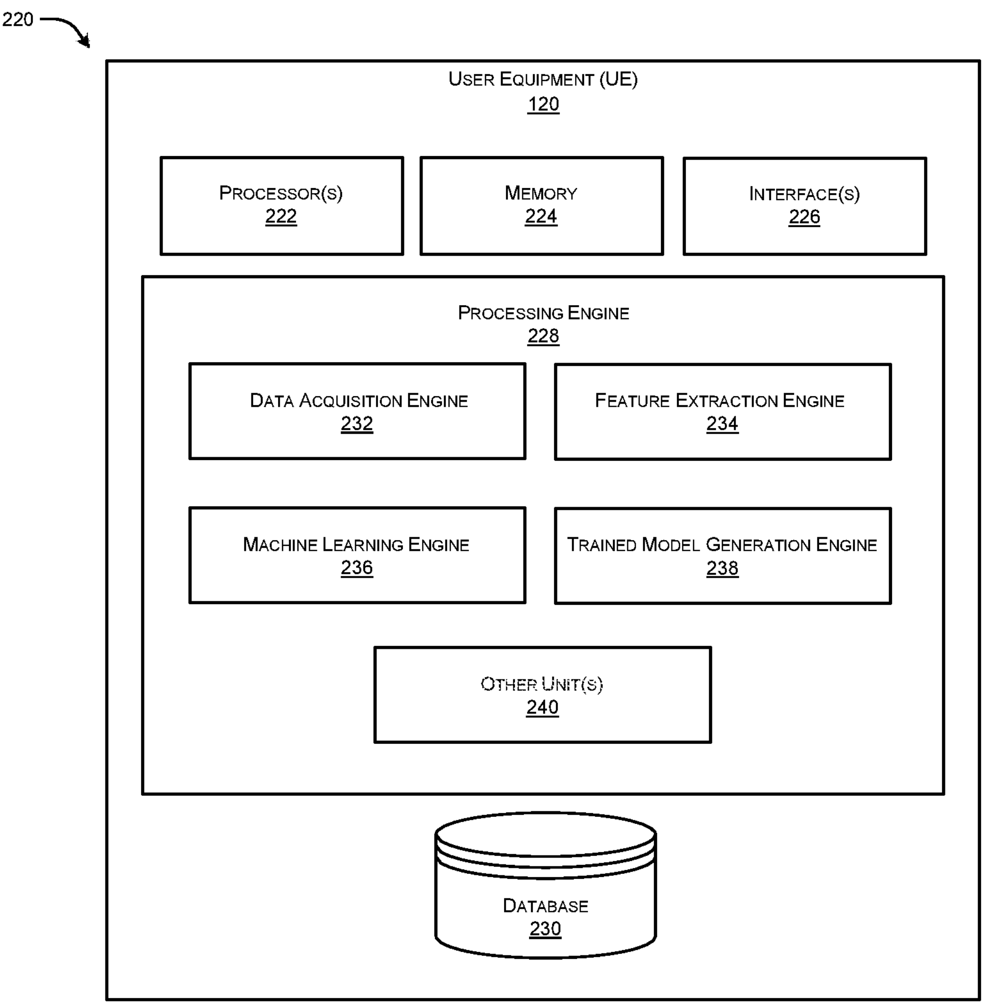
FIG. 2B illustrates an exemplary representation (220) of a user equipment (UE), in accordance with an embodiment of the present disclosure.

FIG. 2B illustrates an exemplary representation (220) of a user equipment (UE) (120), in accordance with an embodiment of the present disclosure. In an aspect, the UE (108) may comprise a processor (222). The more processor (222) may be implemented as one or more microprocessors, microcomputers, microcontrollers, digital signal processors, central processing units, logic circuitries, and/or any devices that process data based on operational instructions. Among other capabilities, the processor(s) (222) may be configured to fetch and execute computer-readable instructions stored in a memory (224) of the UE (108). The memory (224) may be configured to store one or more computer-readable instructions or routines in a non-transitory computer readable storage medium, which may be fetched and executed to create or share data packets over a network service. The memory (224) may comprise any non-transitory storage device including, for example, volatile memory such as RAM, or non-volatile memory such as EPROM, flash memory, and the like.

In an embodiment, the UE (120) may include an interface(s) 226. The interface(s) 226 may comprise a variety of interfaces, for example, interfaces for data input and output devices, referred to as I/O devices, storage devices, and the like. The interface(s) 226 may facilitate communication of the UE (120). Examples of such components include, but are not limited to, processing engine(s) 228 and a database (230).

The processing engine(s) (228) may be implemented as a combination of hardware and programming (for example, programmable instructions) to implement one or more functionalities of the processing engine(s) (228). In examples described herein, such combinations of hardware and programming may be implemented in several different ways. For example, the programming for the processing engine(s) (228) may be processor executable instructions stored on a non-transitory machine-readable storage medium and the hardware for the processing engine(s) (228) may comprise a processing resource (for example, one or more processors), to execute such instructions. In the present examples, the machine-readable storage medium may store instructions that, when executed by the processing resource, implement the processing engine(s) (228). In such examples, the UE (120) may comprise the machine-readable storage medium storing the instructions and the processing resource to execute the instructions, or the machine-readable storage medium may be separate but accessible to the UE (120) and the processing resource. In other examples, the processing engine(s) (228) may be implemented by electronic circuitry.

The processing engine (228) may include one or more engines selected from any of a data acquisition (232), a feature extraction (234), a machine learning (ML) engine (236), and other engines (238). The other engines may include face reconstruction module, a Guided Generative Adversarial Network (GAN) module, Delauney triangulation module, Pyramid Blending module, transfer network module and Hessian aided error compensation module and the like.

Figure 2C:
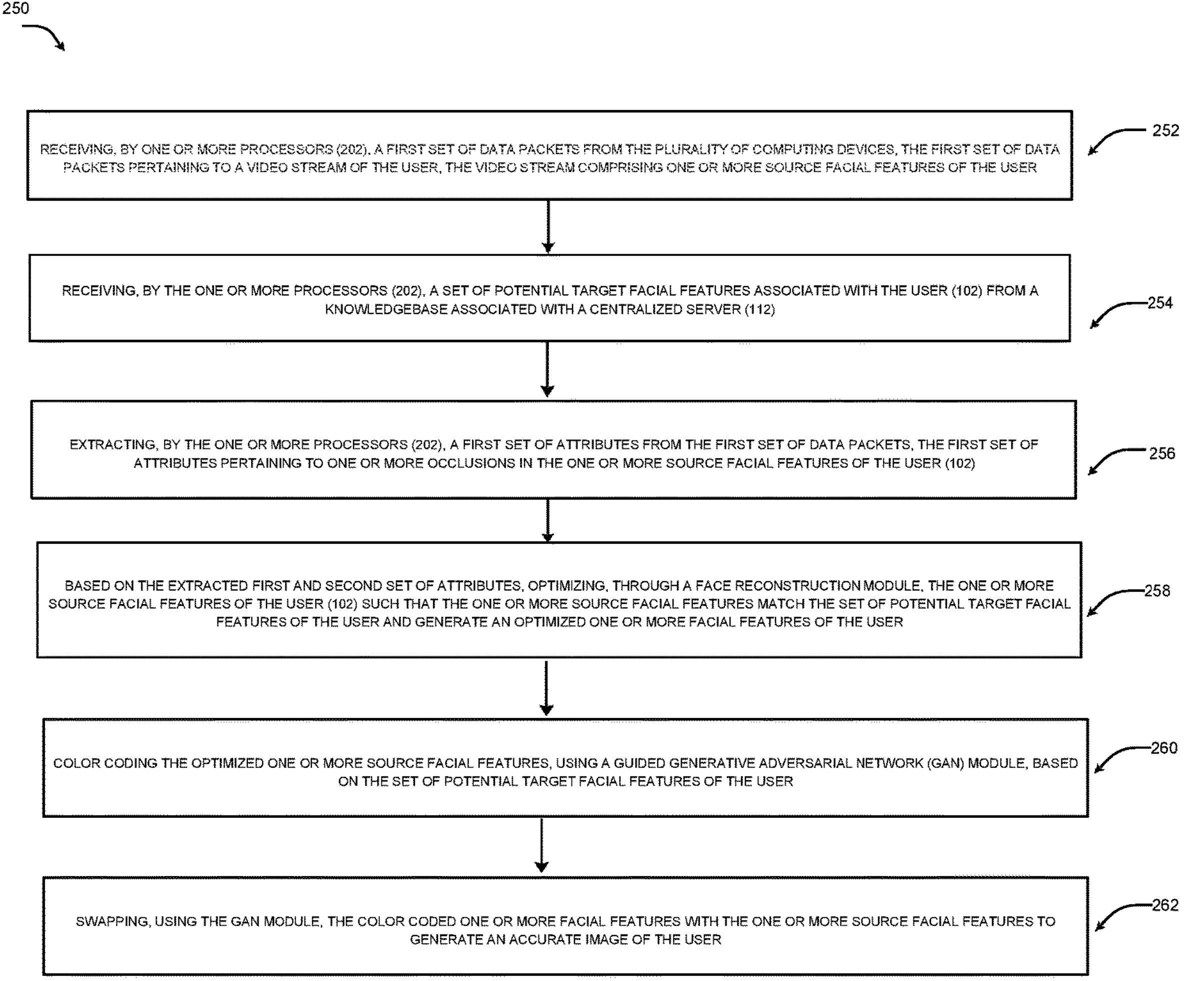
FIG. 2C illustrates an exemplary representation of a proposed method (250), in accordance with an embodiment of the present disclosure.

FIG. 2C illustrates an exemplary representation of a proposed method (250), in accordance with an embodiment of the present disclosure. As illustrated, in an aspect, the method (250) highlights the steps of facilitating real time face swapping of a user. The method may include at 252, the step of receiving, by one or more processors (202), a first set of data packets from the plurality of computing devices (104), the first set of data packets pertaining to a video stream of the user (102), the video stream comprising one or more source facial features of the user (102).

Further, the method (250) may include at 254, the step of receiving, by the one or more processors (202), a set of potential target facial features associated with the user from a knowledgebase associated with a centralized server (112).

The method may include at 256, the step of extracting, by the one or more processors, a first set of attributes from the first set of data packets, the first set of attributes pertaining to one or more occlusions in the one or more source facial features of the user.

At 258, based on the extracted first and second set of attributes, the method may include the step of optimizing, through a face reconstruction module, the one or more source facial features of the user such that the one or more source facial features match the set of potential target facial features of the user and generate an optimized one or more facial features of the user.

The method may include at 260, the step of color coding the optimized one or more source facial features, using a Guided Generative Adversarial Network (GAN) module, based on the set of potential target facial features of the user.

Furthermore, the method may include at 262, the step of swapping, using the GAN module, the color coded one or more facial features with the one or more source facial features to generate an accurate image of the user.

Figure 3:
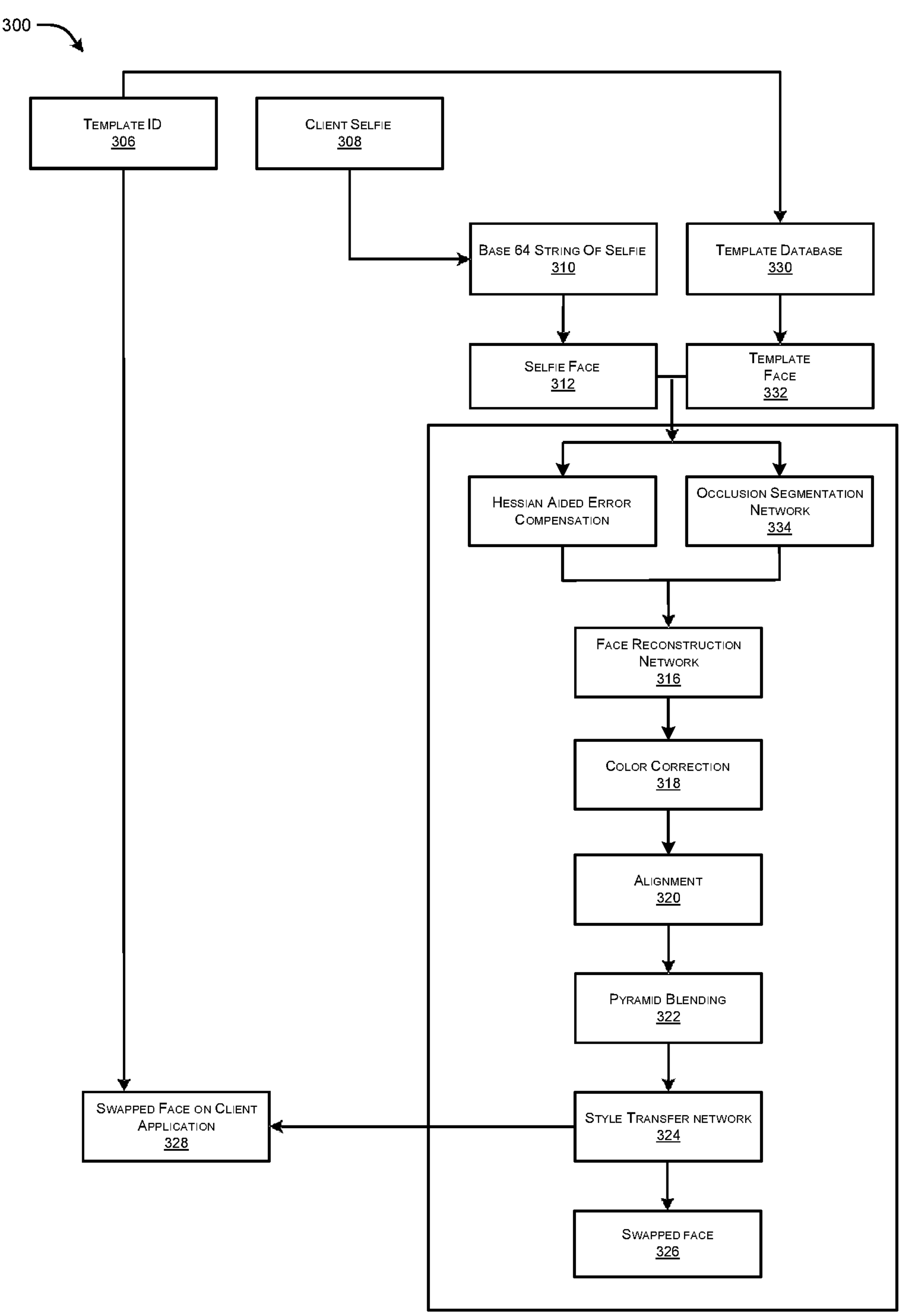
FIG. 3 illustrates an exemplary representation of the proposed system architecture, in accordance with an embodiment of the present disclosure.

FIG. 3 illustrates an exemplary representation of the proposed system architecture, in accordance with an embodiment of the present disclosure.

As illustrated, the system architecture (300) includes a client application (302) and a server (304) wherein a real time system of Guided Generative Adversarial network for face swap can be configured. For a given pair of source image such as template id (306) and client selfie (308). The client selfie (306) can be sent in base 64 string format (310) over network, which can be converted back to selfie face (312) and the template id (306) can be checked with a template database (330) to generate a template face (332). Both the selfie face (312) and the template face (332) can be sent to a Hessian aided error compensation (314) to generate skin regions occluded due to specs and beards. Another uses occlusion segmentation network (334) to get occlusion encodings and occlusion mask. The output of Hessian aided error compensation (314) and the occlusion segmentation network (334) are fed to face reconstruction network (316) for optimization of skin textures. This is then sent to a color correction block (318) and is further sent to alignment block (320 to align this face according to alignment (320) of target face. Then Pyramid Blending (322) may be then done after which the output is sent to a style transfer network (324) to optimize overall result.

Figure 4:
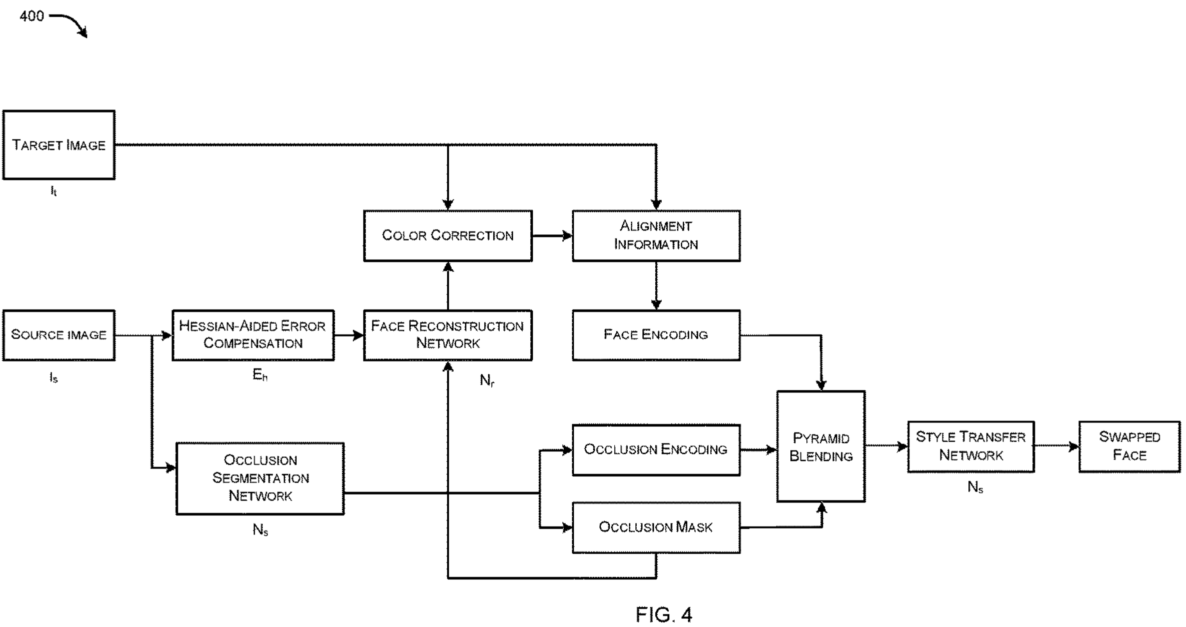
FIG. 4 illustrates an exemplary representation of a flow diagram of the proposed method, in accordance with an embodiment of the present disclosure.

FIG. 4 illustrates an exemplary representation of a flow diagram of the proposed method, in accordance with an embodiment of the present disclosure. As illustrated, the real time system of Guided Generative Adversarial network for face swap method is shown. In an exemplary implementation, for a given pair of source image (Is) and target image (It), if the source image contains occlusions (like specs, beards), two processes happen simultaneously. One applies Hessian aided error compensation (Eh) to generate skin regions occluded due to specs and beards. Another uses occlusion segmentation network (Ns) to get occlusion encodings and occlusion mask. The output of Hessian aided error compensation (Eh) and the segmentation mask are fed to face reconstruction network (Nr) for optimization of skin textures. This is then color corrected according to color distribution of target image. Then Delaunay Triangulation is used to align this face according to alignment of target face. Then Pyramid Blending is performed in which face encoding is convolved with occlusion encoding using the mask from segmentation network to give the final swapped face. Next, style transfer network (Ns) is used to optimize overall result, which may be keeping the hairstyle of source face intact and preserving finer details.

Figure 5A:
FIGS. 5A-5F illustrate exemplary representations of face swapping analysis and its implementation, in accordance with an embodiment of the present disclosure.

FIGS. 5A-5D illustrate exemplary representations of face swapping analysis and its implementation, in accordance with an embodiment of the present disclosure. As illustrated in FIG. 5A, a face detection methodology is shown. The Face detection methodology can identify human faces in photographs. The frontal face detector in dlib works well. It is simple and just works out of the box. It uses HOG (Histogram of Oriented Gradients) feature descriptor with a linear SVM machine learning algorithm to perform face detection. HOG is a simple and powerful feature descriptor. It is not only used for face detection but also it is widely used for object detection like cars, pets, and fruits. HOG is robust for object detection because object shape is characterized using the local intensity gradient distribution and edge direction.

In an exemplary implementation, Facial Landmarks Detection provides accurate identification of landmarks within facial images is an important step in the completion of a number of higher-order computer vision tasks. Facial landmark detection is the task of detecting key landmarks on the face and tracking them (being robust to rigid and non-rigid facial deformations due to head movements and facial expressions). Facial landmarks detection or facial key points detection has a lot of uses in computer vision like face alignment, drowsiness detection, etc. Facial landmark detection may utilise but not limited to Dlib's 68 key points landmark predictor which gives very good results in real-time.

In an exemplary implementation, face alignment can be used for identifying the geometric structure of human faces in digital images. Given the location and size of a face, it automatically determines the shape of the face components such as eyes and nose. A face alignment program typically operates by iteratively adjusting a deformable models, which encodes the prior knowledge of face shape or appearance, to take into account the low-level image evidences and find the face that is present in the image.

Figure 5B:
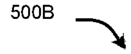
Figure 5B:
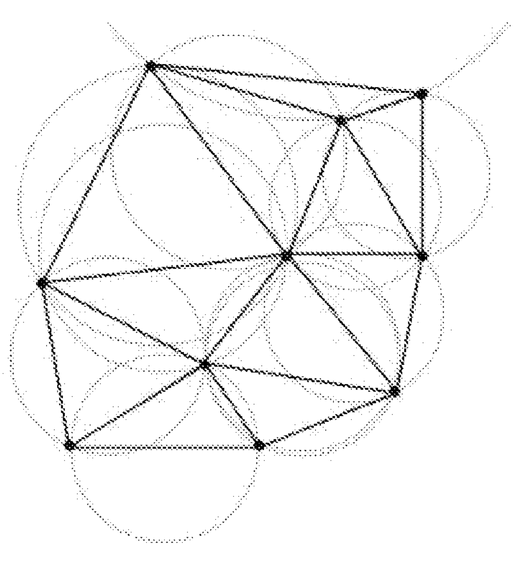

FIG. 5B illustrates a Delaunay triangulation methodology. After obtaining facial landmarks, the faces in 3D need to wrapped, even though there is no 3D information. In order to do so, a small area around each feature can be considered to be a 2D plane. These 2D plane can be transformed and into 2D planes of other face to approximate 3D information of face. Using the facial features, triangulation. Triangulating or forming a triangular mesh over the 2D image is simple but to triangulate such that it's fast and has an "efficient" triangulation, Delaunay Triangulation but not limited to it can be used. In an exemplary implementation, the face can be split into a plurality of triangles using Delaunay Triangulation, then the plurality of triangles can be swapped in the corresponding region.

In mathematics, and computational geometry, a Delaunay triangulation for a set P of points in the plane is a triangulation DT(P) such that no point in P is inside the circumcircle of any triangle in DT(P). Delaunay triangulations maximize the minimum angle of all the angles of the triangles in the triangulation; and tend to avoid skinny triangles. Based on Delaunay's definition, the circumcircle of a triangle formed by three points from the original point set is empty if it does not contain vertices other than the three that define it (other points are permitted only on the very perimeter, not inside). The Delaunay condition states that a triangle net is a Delaunay triangulation if all the circumcircles of all the triangles in the net are empty. This is the original definition for two-dimensional spaces. It is possible to use it in three-dimensional spaces by using a circumscribed sphere in place of the circumcircle. For a set of points on the same line there is no Delaunay triangulation (in fact, the notion of triangulation is undefined for this case). For 4 points on the same circle (e.g., the vertices of a rectangle) the Delaunay triangulation is not unique: clearly, the two possible triangulations that split the quadrangle into two triangles satisfy the Delaunay condition. Generalizations are possible to metrics other than Euclidean. However, in these cases a Delaunay triangulation is not guaranteed to exist or be unique.

Figure 5C:
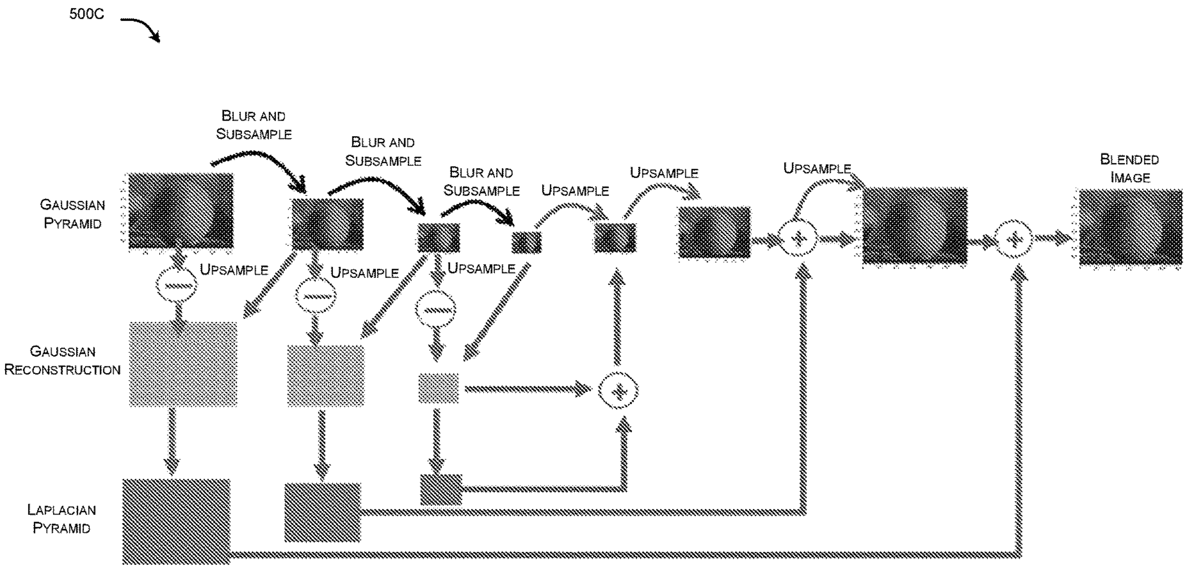
Figure 5D:
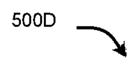
Figure 5D:
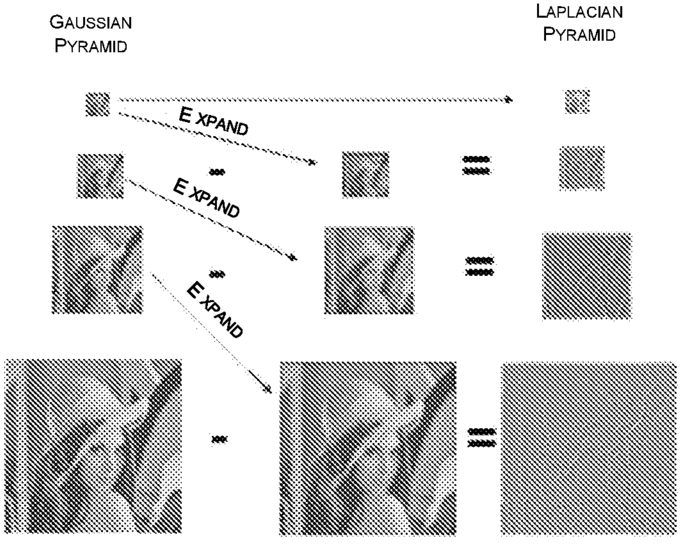
Figure 5E:
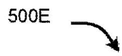
Figure 5E:
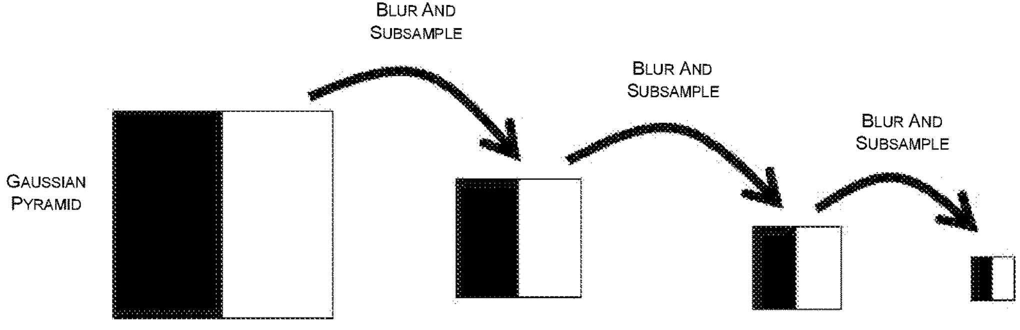

FIGS. 5C, 5D and 5E illustrate exemplary representations of Pyramid Blending implementation. There are two kinds of Image Pyramids, Gaussian Pyramid and Laplacian Pyramids. Higher level (Low resolution) in a Gaussian Pyramid is formed by removing consecutive rows and columns in Lower level (higher resolution) image. Then each pixel in higher level is formed by the contribution from 5 pixels in underlying level with gaussian weights. By doing so, a M×N image becomes M/2×N/2 image. So, area reduces to one-fourth of original area. It is called an Octave. The same pattern continues as we go upper in pyramid (i.e., resolution decreases). Similarly, while expanding, area becomes 4 times in each level.

Laplacian Pyramids are formed from the Gaussian Pyramids. There is no exclusive function for that. Laplacian pyramid images are like edge images only. Most of its elements are zeros. They are used in image compression. A level in Laplacian Pyramid is formed by the difference between that level in Gaussian Pyramid and expanded version of its upper level in Gaussian Pyramid.

Pyramid Blending has given more visually appealing results as compared to different blending methods. The steps for pyramid blending may include:

Loading the two images and the mask.

Finding the Gaussian pyramid for the two images and the mask.

From the Gaussian pyramid, calculating the Laplacian pyramid for the two images as explained in the previous blog.

Blending each level of the Laplacian pyramid according to the mask image of the corresponding Gaussian level.

From the blended Laplacian pyramid, reconstructing the original image. This is done by expanding the level and adding it to the below level as shown in the figure below.

Figure 5F:
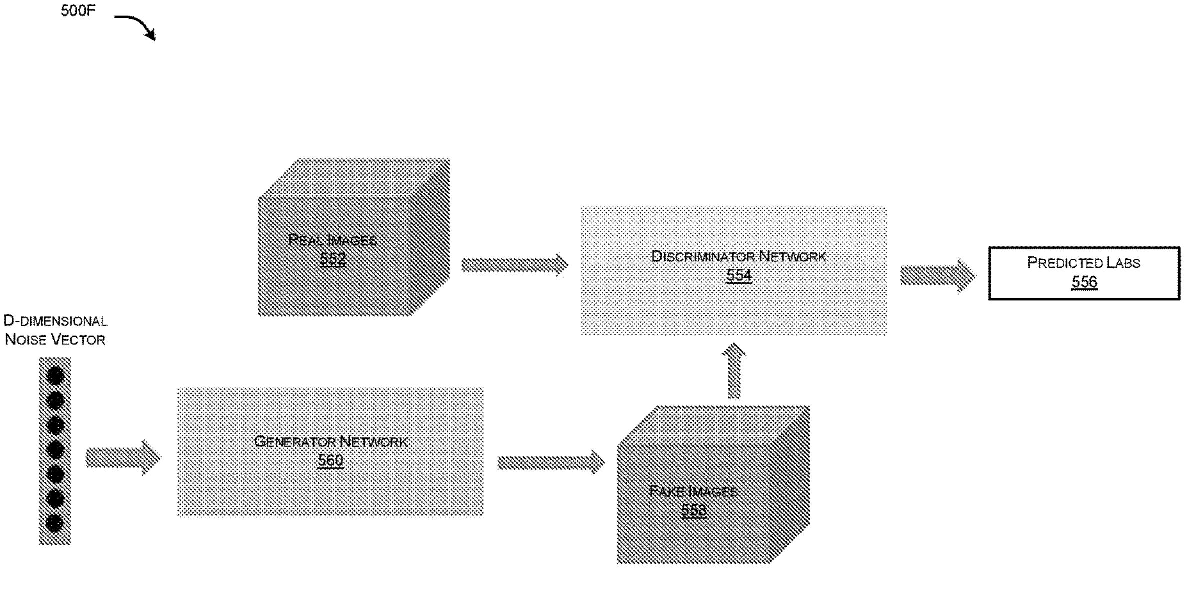

FIG. 5F illustrates an exemplary representation of a Generative Adversarial Network (GAN) architecture that can use two neural networks, pitting one against the other in order to generate new, synthetic instances of data that can pass for real data. They are used widely in image generation, video generation and voice generation. One neural network, called generator (560), can generate new data instances, while the other, the discriminator (554) can evaluate the data for authenticity; i.e. the discriminator (54) can decide whether each instance of data that it reviews belongs to the actual training dataset or not.

Meanwhile, the generator is creating new, synthetic images that it passes to the discriminator. It does so in the hopes that they, too, will be deemed authentic, even though they are fake. The goal of the generator is to generate passable hand-written digits: to lie without being caught. The goal of the discriminator is to identify images coming from the generator as fake. The steps the GAN takes:

The generator takes in random numbers and returns an image.

This generated image is fed into the discriminator alongside a stream of images taken from the actual, ground-truth dataset.

The discriminator takes in both real images (552) and fake images (554) and returns probabilities, a number between 0 and 1, with 1 representing a prediction of authenticity and 0 representing fake so that a double feedback loop can be created.

The discriminator is in a feedback loop with the ground truth of the images, which we know.

The generator is in a feedback loop with the discriminator.

Figure 6:
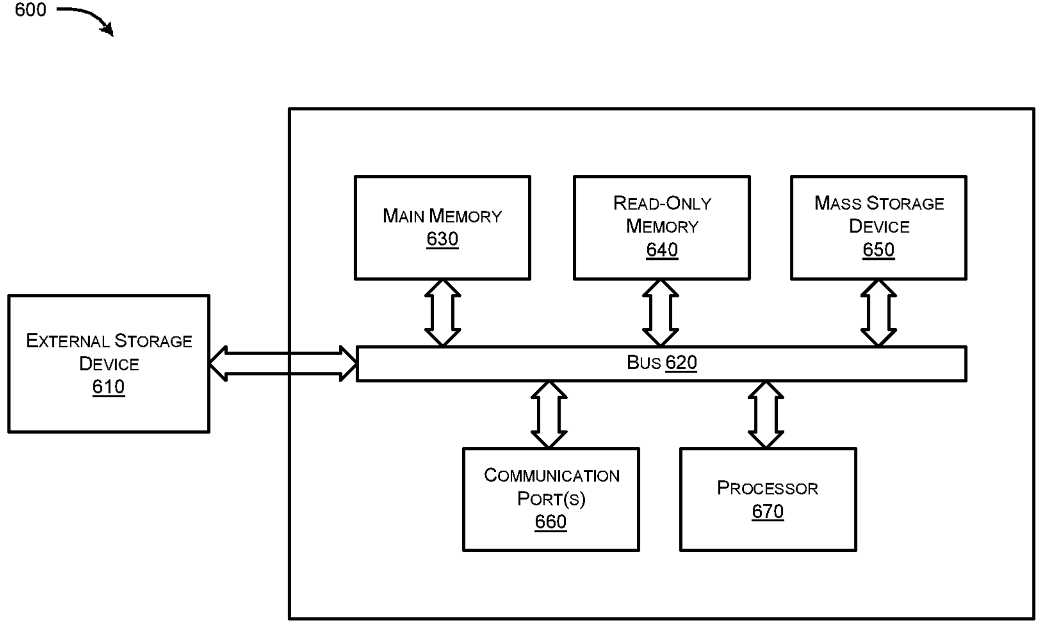
FIG. 6 illustrates an exemplary computer system in which or with which embodiments of the present invention can be utilized in accordance with embodiments of the present disclosure.

FIG. 6 illustrates an exemplary computer system in which or with which embodiments of the present invention can be utilized in accordance with embodiments of the present disclosure. As shown in FIG. 6, computer system 600 can include an external storage device 610, a bus 620, a main memory 630, a read only memory 640, a mass storage device 650, communication port 660, and a processor 670. Processor 660 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions.

Bus 620 communicatively couples processor(s) 670 with the other memory, storage and communication blocks. Optionally, operator and administrative interfaces, e.g. a display, keyboard, and a cursor control device, may also be coupled to bus 620 to support direct operator interaction with a computer system. Other operator and administrative interfaces can be provided through network connections connected through communication port 660. Components described above are meant only to exemplify various possibilities. In no way should the aforementioned exemplary computer system limit the scope of the present disclosure.

Thus, the present disclosure provides a unique and inventive solution for face swapping in real time.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

We claim:

1. A system for facilitating real time face swapping of a user, said system comprising:

one or more processors operatively coupled to a plurality of user computing devices, said one or more processors comprising a memory, said memory storing instructions which when executed by the one or more processors causes the system to:

receive a first set of data packets from the plurality of computing devices, the first set of data packets pertaining to a video stream of the user, the video stream comprising one or more source facial features of the user;

receive a set of potential target facial features associated with the user from a knowledgebase associated with a centralized server;

extract a first set of attributes from the first set of data packets, the first set of attributes pertaining to one or more occlusions in the one or more source facial features of the user;

based on the extracted first set of attributes, optimize, through a face reconstruction module, the one or more source facial features of the user such that the one or more source facial features match the set of potential target facial features of the user and generate an optimized one or more facial features of the user;

color code the optimized one or more source facial features, using a Guided Generative Adversarial Network (GAN) module, based on the set of potential target facial features of the user;

swap, using the GAN module, the color coded one or more facial features with the one or more source facial features to generate an accurate image of the user;

convolve, by using a Pyramid Blending module, the optimized one or more facial encoding with occlusion encoding using a mask from a segmentation network module to generate a final swapped accurate image of the user;

generate, using a machine learning (ML) model, a trained model configured to process the accurate image of the user to identify and verify the user in real time;

predict, by a ML engine, from a plurality of services received by the system, an information service associated with the final swapped accurate image of the user;

facilitate, by the ML engine, a response corresponding to the information service to the user based on the trained model; and auto-generate, by the ML engine, the response by the system to the user.

2. The system as claimed in claim 1, wherein the system is further configured to align, by using a Delaunay Triangulation module, the accurate image of the user according to alignment of the set of potential target facial features of the user.

3. The system as claimed in claim 1, wherein the system is further configured to preserve, by using a transfer network module, a set of finer feature details of the final swapped accurate image of the user.

4. The system as claimed in claim 1, wherein the system is further configured to generate, using a Hessian aided error compensation module, one or more skin regions occluded due to the one or more occlusions in the one or more facial features of the user.

5. The system as claimed in claim 1, wherein the system is further configured to detect the one or more source facial features using one or more face detection devices such as scanning and extraction camera sensor.

6. The system as claimed in claim 1, wherein the video stream of the user comprises a plurality of variations and diverse face profiles of the user.

7. The system as claimed in claim 1, wherein the plurality of variations and diverse face profiles of the user includes a plurality of profiles such as left, right, front and back.

8. The system as claimed in claim 1, wherein the system is further configured to:

store, based on a consent of the user, the one or more source facial features of the user; and store based on the one or more face detection devices available in the user computing device associated with the user.

9. A user equipment (UE) for facilitating real time face swapping of a user, said UE comprising:

a processor comprising a memory, said memory storing instructions which when executed by the processor causes the UE to:

receive a first set of data packets from a plurality of computing devices, the first set of data packets pertaining to a video stream of the user, the video stream comprising one or more source facial features of the user;

receive a set of potential target facial features associated with the user from a knowledgebase associated with a centralized server;

extract a first set of attributes from the first set of data packets, the first set of attributes pertaining to one or more occlusions in the one or more source facial features of the user;

based on the extracted first set of attributes, optimize, through a face reconstruction module, the one or more source facial features of the user such that the one or more source facial features match the set of potential target facial features of the user and generate an optimized one or more facial features of the user;

color code the optimized one or more source facial features, using a Guided Generative Adversarial Network (GAN) module, based on the set of potential target facial features of the user;

swap, using the GAN module, the color coded one or more facial features with the one or more source facial features to generate an accurate image of the user;

convolve, by using a Pyramid Blending module, the optimized one or more facial encoding with occlusion encoding using a mask from a segmentation network module to generate a final swapped accurate image of the user;

generate, using a machine learning (ML) model, a trained model configured to process the accurate image of the user to identify and verify the user in real time;

predict, by a ML engine, from a plurality of services received by the system, an information service associated with the final swapped accurate image of the user;

facilitate, by the ML engine, a response corresponding to the information service to the user based on the trained model; and auto-generate, by the ML engine, the response by the system to the user.

10. A method for facilitating real time face swapping of a user, said method comprising:

receiving, by one or more processors, a first set of data packets from the plurality of computing devices, the first set of data packets pertaining to a video stream of the user, the video stream comprising one or more source facial features of the user, wherein the one or more processors are operatively coupled to a plurality of user computing devices, said one or more processors comprising a memory, said memory storing instructions which are executed by the one or more processors;

receiving, by the one or more processors, a set of potential target facial features associated with the user from a knowledgebase associated with a centralized server;

extracting, by the one or more processors, a first set of attributes from the first set of data packets, the first set of attributes pertaining to one or more occlusions in the one or more source facial features of the user;

based on the extracted first set of attributes, optimizing, through a face reconstruction module, the one or more source facial features of the user such that the one or more source facial features match the set of potential target facial features of the user and generate an optimized one or more facial features of the user;

color coding the optimized one or more source facial features, using a Guided Generative Adversarial Network (GAN) module, based on the set of potential target facial features of the user;

swapping, using the GAN module, the color coded one or more facial features with the one or more source facial features to generate an accurate image of the user;

convolving, by using a Pyramid Blending module, the optimized one or more facial encoding with occlusion encoding using a mask from a segmentation network module to generate a final swapped accurate image of the user;

generating, using a machine learning (ML) model, a trained model configured to process the accurate image of the user to identify and verify the user in real time;

predicting, by a ML engine, from a plurality of services received by the system, an information service associated with the final swapped accurate image of the user;

facilitating, by the ML engine, a response corresponding to the information service to the user based on the trained model; and auto-generating, by the ML engine, the response by the method to the user.

11. The method as claimed in claim 10, wherein the method further comprises step of aligning, by using a Delaunay Triangulation module, the accurate image of the user according to alignment of the set of potential target facial features of the user.

12. The method as claimed in claim 10, wherein the method further comprises step of preserving, by using a transfer network module, a set of finer feature details of the final swapped accurate image of the user.

13. The method as claimed in claim 10, wherein the method further comprises step of generating, using a Hessian aided error compensation module, one or more skin regions occluded due to the one or more occlusions in the one or more facial features of the user.

14. The method as claimed in claim 10, wherein the method further comprises step of detecting the one or more source facial features using one or more face detection devices such as scanning and extraction camera sensor.

15. The method as claimed in claim 10, wherein the video stream of the user comprises a plurality of variations and diverse face profiles of the user.

16. The method as claimed in claim 10, wherein the plurality of variations and diverse face profiles of the user includes a plurality of profiles such as left, right, front and back.

17. The method as claimed in claim 10, wherein the method further comprises step of:

storing, based on a consent of the user, the one or more source facial features of the user; and storing based on the one or more face detection devices available in the user computing device associated with the user.

* * * * *